United States Patent [19]

Hanisko

[11] 4,284,052

[45] Aug. 18, 1981

[54] SEQUENTIAL INJECTOR TIMING APPARATUS

[75] Inventor: John C. P. Hanisko, Southfield, Mich.

[73] Assignee: The Bendix Corporation, Southfield, Mich.

[21] Appl. No.: 69,000

[22] Filed: Aug. 23, 1979

[51] Int. Cl.$^3$ ............................................. F02D 5/02
[52] U.S. Cl. ................................. 123/490; 123/476
[58] Field of Search ............... 123/478, 487, 494, 414, 123/612, 613, 617, 476, 477, 490

[56] References Cited

U.S. PATENT DOCUMENTS

| | | | |
|---|---|---|---|
| 3,418,989 | 12/1968 | Silverman | 123/613 |
| 3,757,755 | 9/1973 | Carner | 123/612 |
| 3,809,029 | 5/1974 | Wakamatsu et al. | 123/32 EA |
| 4,039,931 | 8/1977 | Schweizer | 324/16 T |
| 4,142,483 | 3/1979 | Ironside | 123/487 |

*Primary Examiner*—Charles J. Myhre
*Assistant Examiner*—Andrew M. Dolinar
*Attorney, Agent, or Firm*—William A. Marvin; Russel C. Wells

[57] ABSTRACT

An actuation timing apparatus is disclosed for providing triggering and steering control signals to an electronic control unit regulating a plurality of solenoid fuel injectors of a sequential injection system. The apparatus includes a rotatable member which is rotated in synchronism with the engine at the speed of its camshaft. The rotatable member has a plurality of spaced sensible elements geometrically disposed thereon and divided into groups identifying individual cylinders. Each group has at least one sensible element which defines a reference element having a recognizable characteristic distinguishing it from the other sensible elements in the group. A single sensor senses the spaced sensible elements of each group as they rotate past a fixed sensing location and generates corresponding electrical pulses to a pulse processing circuit. The pulse processing circuit decodes each group of pulses to provide the identity of the injector to be next actuated. The pulse processing circuit recognizes the reference element and an enabling element of each group to generate an enabling signal to the electronic control unit (ECU) indicating that the decoding process for the group has been accomplished. The decoded information is sampled upon receipt of the enabling signal and causes the electronic control unit to steer the next injection pulse to the identified injector.

17 Claims, 4 Drawing Figures

SEQUENTIAL INJECTOR TIMING APPARATUS

CROSS REFERENCE TO RELATED APPLICATION

The present application is related to my previously filed application entitled "Electronic Control Apparatus For Internal Combustion Engine," Ser. No. 948,453; filed on Oct. 4, 1978 and which is commonly assigned with this application.

BACKGROUND OF THE INVENTION

The invention pertains generally to multipoint electronic fuel injection systems which are sequentially actuated and is particularly directed to a single sensor actuation timing apparatus for providing control signals containing timing and steering information synchronized to each individual injector.

In a sequential fuel injection system for an internal combustion system the "trigger" or actuating control signal needs to carry at least two types of information. The primary information the control signal must carry is the actual timing of the injector actuation and secondarily information must be contained for steering that injection signal to the proper cylinder of the engine.

In such a system actuation must be initiated for successive cylinders after so many degrees of crankshaft rotation; for example, every 90° of rotation in the case of an eight cylinder engine. After this injection timing information is developed it must then be steered to the proper cylinder in the sequential firing order of the system. This fact implies that the steering information must also be related to crankshaft rotation.

One technique is to provide steering information to synchronize the injection on a pulse immediately following a reference pulse indicating a selected cylinder and then rely on a ring counter to distribute the injection pulses that follow to the proper injectors according to the engine's firing order.

U.S. Pat. No. 3,809,029 issued to Wakamatsu et al. discloses an ignition and fuel injection timing system. A portion of the system consists of a means for obtaining fuel injection timing and steering information. One sensor is provided for each cylinder to obtain the fuel injection information. The circuit which controls the triggering of any one injector receives signals from the other two of the sensors. Sensible elements of a disk connected to the camshaft of the engine are sensed when the sensible elements include a reference element having a width different from the nonreference element. All of the elements are separated by equal spaces. The triggering of each individual injector is initiated by the passage of the reference element under the sensor associated with that injector. The nonreference elements function as countable items to obtain appropriate phase shifts in triggering. An electrical integrator and a comparator produce a reference or sync pulse.

Another system is described in my cross referenced application where I disclose a single sensor timing apparatus for providing steering and timing control signals. Described therein is a rotatable element having a plurality of like sensible elements which are equally spaced around a rotating member. Another sensible element located on the rotating member defines a reference element which has a recognizable geometric characteristic distinguishing it from the other sensible elements. Additionally, the spacing between the reference element and an adjacent element defines a predetermined distance different than the distance between any two adjacent nonreference elements.

Although my previous system provides steering and actuation information with a single sensor, synchronization of the sequential cycle of the system occurs only once every two engine revolutions. This technique can create difficulty in starting an internal combustion engine particularly when an extremely fast and emission free start is desirable.

Waiting two engine revolutions for the timing and steering control to synchronize will produce delays that are unacceptable in the starting operation of an internal combustion engine especially at colder temperatures. At 0° F. the cranking speed of the engine may slow to 60 rpms and at colder temperatures, −20° F. for example, may drop to as low as 30 rpms. Respectively, this could introduce a delay as long as two seconds and four seconds before synchronization can occur. Fuel is not injected into the engine during this time thereby unduly lengthening the starting time. Fuel cannot be injected before synchronization because the electronics may initialize in an incorrect signal sequence. If this happens the double injection of a cylinder is possible with a resulting start that is laden with high emissions.

Therefore, in a sequential multipoint system it would be advantageous to provide an actuation timing apparatus which would positively identify the engine position of the next injector to be actuated by synchronizing on each injector.

SUMMARY OF THE INVENTION

An object of the present invention is to provide an actuation timing apparatus for generating control signals containing timing and steering information for the actuation of the electronic fuel injectors of a sequential fuel injection system wherein the control is provided with a single sensor and synchronization is provided with each cylinder or injector.

Another object of this invention is to provide such apparatus for an internal combustion engine having N cylinders wherein the timing apparatus includes a disk containing N groups of sensible elements wherein the spacing and geometries of the sensible elements allows for the synchronization and timing of the actuations.

In accordance with these objects, the invention provides an actuation timing apparatus including a rotatable member having a plurality of spaced sensible elements geometrically disposed thereon and divided into groups identifying individual cylinders. A single sensor senses the spaced elements of each group as they rotate past a fixed sensing location to provide corresponding electrical pulses to a pulse processing circuit. Each group of elements is decoded by the pulse processing circuit to generate a plurality of control signals to an electronic control unit. The control signals contain steering information indicating the injector to be next actuated and timing information indicating when that actuation is to take place.

In a preferred implementation each group of sensible elements is disposed at the leading edge of a sector of the rotatable member. The rotatable member contains N sectors where N is the number of injectors of the fuel injection system to be actuated. For each sector the sensible elements are arranged to include a plurality of counting elements, the number of which describes the identity of the sector. The counting elements include at least one reference element, geometrically dissimilar to the rest of the elements, that is utilized to indicate a sector identity has been established. The groups further include an enabling element which indicates when the information should be transferred to the electronic control unit.

The pulse processing means include means for counting the pulse signals received from the sensor to identify the sector being presently sensed. Further included are means for detecting the reference element of each group and for disabling the counting means when the reference element indicates the sector has been identified. The counting means is operable to present a representation of the identity of the sector on an identification bus connected to the electronic control unit.

The pulse processing circuit transmits an enabling signal upon receipt of the enabling pulse to alert the electronic control unit that identity of the sector just sensed has been established and is available on an identification bus. Responsive to the enabling signal the electronic control unit samples the steering information in the identification bus and resets the counting means. Timing information is thereafter transmitted to the electronic control unit from the pulse processing circuit as a trigger signal indicating that the injector corresponding to the identified sector should be actuated. Preferably, this is accomplished by generating the trigger signal synchronously with the first counting pulse of the next successive sector.

These and other objects, features, and aspects of the invention will be more fully understood and better described if a reading of the following Detailed Description is undertaken in conjunction with the appended drawings wherein:

DETAILED DESCRIPTION OF THE PREFERRED EMBODIMENT

Figure 1:
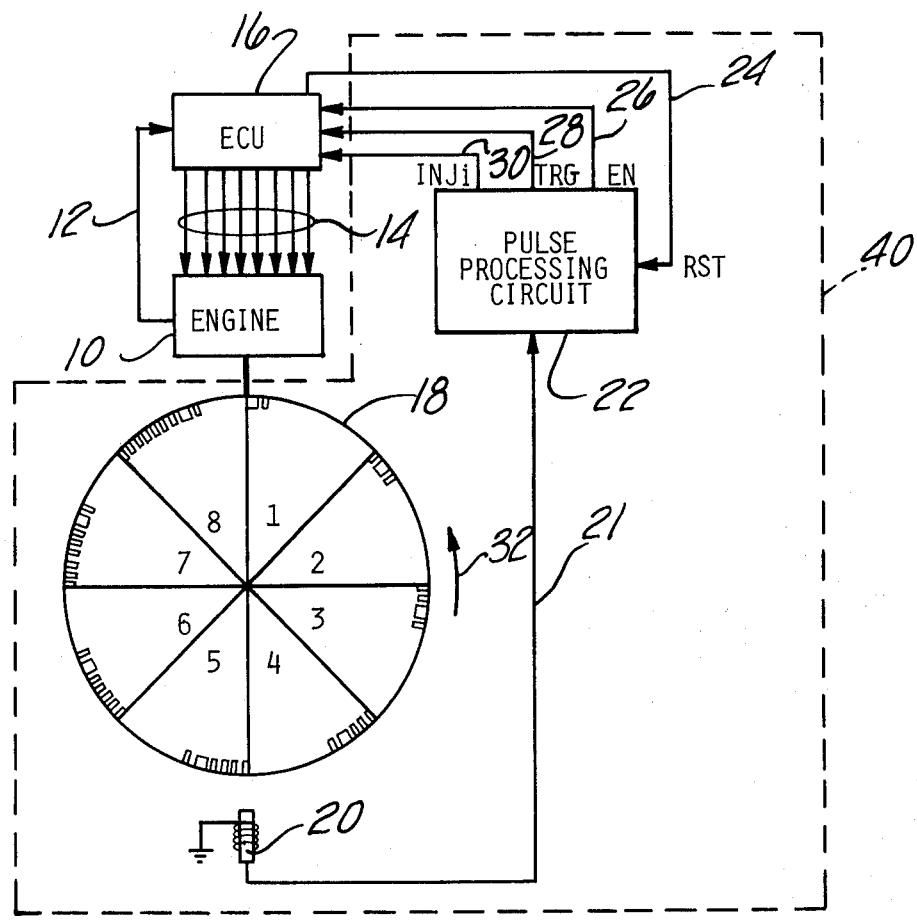
FIG. 1 is a system block diagram of a multipoint electronic fuel injection system including an actuation timing apparatus constructed in accordance with the invention.

Illustrated in FIG. 1 is an actuation timing control apparatus 40 for the timing and synchronization of control signals that command the fuel injection of an internal combustion engine 10. The engine 10 is equipped with a conventional multipoint fuel injection system (not shown) which meters fuel into individual cylinders of the engine at particular times that are regulated by an electronic control unit (ECU) 16. As is known, a multipoint system includes a plurality of solenoid injector valves which can be actuated electronically to meter fuel. The electronic control unit 16 communicates electronic metering signals to the fuel injectors of the engine via an injector bus 14. In the implementation shown, the engine 10 is illustrated as having eight injectors which are energized sequentially from the individual leads of the injector bus 14.

The electronic control unit 16 provides pulse width modulated signals over the individual injector leads to actuate the injectors according to the firing order of the engine by measuring a plurality of engine operating parameters indicating the instantaneous condition of the engine and consequently its fuel needs. The operating parameters are sensed by conventional analog sensors (not shown) which transmit their signals to the ECU via a parameter bus 12. These parameter signals are used to calculate the width of pulses and the actuation duration of each injector. The timing and synchronization for firing or actuating the injectors is controlled by the ECU from control signals received from an actuation timing control apparatus 40.

Apparatus 40 comprises a rotatable member or element 18 attached to the camshaft of the engine 10 and rotatable therewith and further a pulse processing circuit 22 which receives pulse information from the rotatable element 18 via a sensor 20. The pulse processing circuit 22 communicates to the ECU via control leads 24-30 which injector is to be fired next in the sequence and when it is to be fired. According to an important object of the invention the ECU upon a start up condition will be able to immediately fire the correct injector without having to wait for up to two engine revolutions to obtain a synchronization pulse. This aspect of the invention will aid in the quick starting of the internal combustion engine and will be particularly advantageous during cold starts.

To accomplish this object the invention divides the rotatable member into a plurality of segments N which are equivalent to the number of cylinders present in the injected engine. In the example shown in FIG. 1 an eight cylinder engine will have eight separate segments 1-8 corresponding to the cylinders of the engine in their firing order. The segments therefore identify which injector in the sequence is to be actuated by the physical positioning of the member 18.

Each segment has a plurality or group of sensible elements uniquely identifying that segment as a corresponding engine crankshaft position. Further, each segment has at least one uniquely identifiable sensible element for indicating when the identification has taken place. By decoding the information contained in the sensible element group of a segment, the identity of the injector associated therewith will be available as steering information for the ECU.

In the preferred embodiment the rotatable element 18 is a sensor wheel or disk adapted to be mechanically affixed in a conventional fashion to an engine camshaft and rotatable therewith in the direction shown by the arrow 32. The sensor 20 is in a stationary position and senses the elements as they rotate past its location. One full rotation of the member 18 will thus correspond to two revolutions of the engine 10 and a full sequential injection cycle. The disk which preferably comprises a magnetically permeable material is divided into the equal segments with each segment having a number of counting elements equivalent to its segment number. Segment 1 has one counting element, segment 2 has two counting elements, segment 3 has three counting elements, etc. Each counting element is formed as a magnetic discontinuity, in this implementation a slot, in the rotatable element that will produce a pulse from sensor 20 as it rotates past. At the end of each counting sequence is the unique or reference element which indicates to the pulse processing circuit 22 that the identity of the segment has been decoded. As illustrated the reference elements are distinguishable geometrically from the rest of the counting elements by their increased length in the direction of rotation of member 18. Additionally, each group is terminated by an enabling element that synchronizes information transfer to the ECU.

Figure 1A:
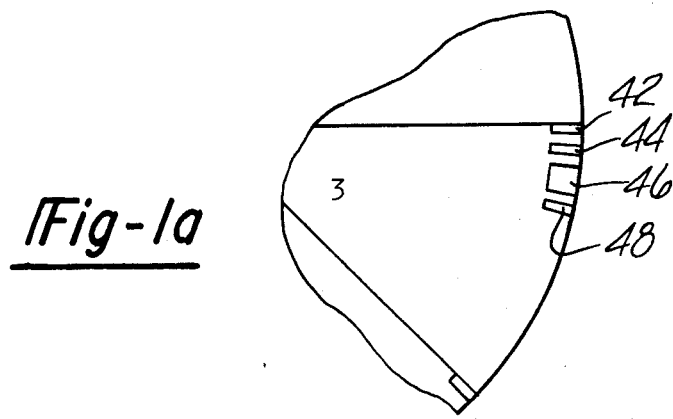
FIG. 1a is an enlarged fragmentary front view of the third segment of the rotatable member used in the actuation timing apparatus illustrated in FIG. 1.

FIG. 1A illustrates the sensible elements in the group for the segment numbered three which corresponds to the third cylinder injected in the sequence. The number of the counting elements 42, 44, and 46 identify the segment as the third segment and the extended width of the segment 46, a geometrical feature unique to the group of sensible elements 42-48, indicates that the identification is complete. An enable pulse 48 synchronizes the sending of the decoded information to the electronic control unit 16 and accompanies the group as the last sensible element therein.

Figure 2:
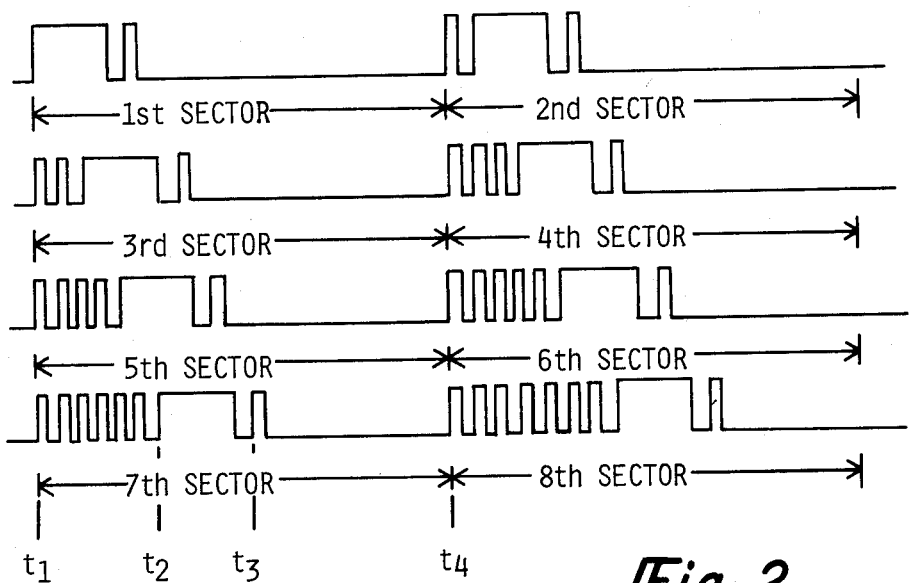
FIG. 2 is a series of waveform diagrams illustrating the pulse groups generated by the sensor included in the actuation timing apparatus disclosed in FIG. 1.

FIG. 2 illustrates the time domain waveforms generated from the sensor 20 for the segments 1-8 during engine operation. The sensor 20 can comprise a Hall effect device and a shaping circuit, such as a Schmitt trigger, to generate the illustrated waveforms from the sensible elements. The sensor transduces the motion of the rotating member into these patterns because of the flux changes produced by the sensible element rotating past the fixed location of the sensor. It is shown that the beginning of each segment is identified by the leading edge of the first pulse in a group and each group contains a number of counting pulses corresponding in a time relationship to the sensible elements passing the sensor 20. Moreover, each group of pulses contain a reference pulse unique because of its duration followed by an enabling pulse. The pulse waveforms are received from the sensor 20 and decoded by the pulse processing circuit 22 to generate control signals to the electronic control unit.

The pulse waveforms have been shown as generated by a rotatable magnetic disc 18 and sensor 20. However, various changes could be made to this combination while providing the identical information. For example, sensor 20 can be an optical sensor and the sensible elements illuminated slots or reflective straps. The magnetic discontinuities can be cogs instead of slots. Further, the rotatable member can comprise a rod shaped member where the sensible elements are arranged as indicia on the peripheral surface and the sensor is perpendicular to the axis of rotation. Other variations are possible and thus the invention should not be limited to the particular sensor and rotatable member combination illustrated.

In operation the actuation timing control apparatus 40 interfaces and communicates with the ECU 16 by the control leads 24-30. Once the pulse processing circuit 22 identifies a certain segment by decoding the pulse signals from the sensor 20, it generates an enable signal EN via enable lead 26 synchronously with the enable pulse of that segment. When the ECU receives the enabling signal EN, it reads or samples an identification bus 30 on which the pulse processing circuit has presented the identity of the injector $INJ_i$ to be energized. After the ECU 16 has sampled the information on identification bus 30 is supplies a reset signal RST via a reset lead 24 to clear the processing circuit for the next sequence. At the beginning of the next segment the pulse processing circuit presents a trigger signal TRG to the ECU via trigger lead 28 to time the actuation of the previously identified injector.

Figure 3:
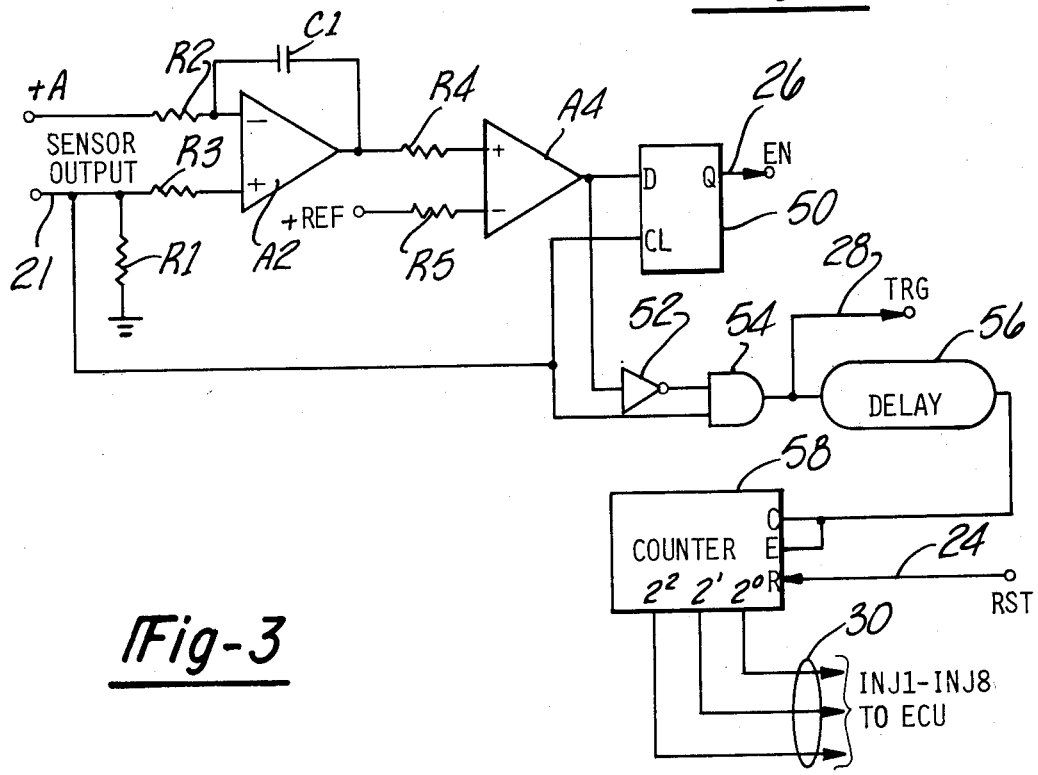
FIG. 3 is a detailed schematic circuit diagram of the pulse processing circuit for the actuation timing apparatus illustrated in FIG. 1.

The detailed circuitry comprising the pulse processing circuit 22 will now be more fully explained with reference to FIG. 3. The pulse processing circuit comprises an amplifier A2 connected as an integrator. The amplifier A2 having an uncommitted collector output is connected at its noninverting input to the sensor lead 21 and receives the pulse signals of the sensor 20 as the rotatable member turns. A capacitor C1 operable to be discharged and charged by the amplifier A2 is connected between the inverting input of the amplifier A2 and its output. A discharging resistor R2 is connected between the inverting input and a source of positive voltage +A. A charging resistor R3 is connected between the noninverting input and the output of the sensor 20.

With no voltage present at its noninverting input the amplifier A2, because of the connection of a positive voltage +A to the inverting input, discharges the capacitor C1 toward ground, at a rate set by the R2C1 combination and the value of +A.

Conversely, pulses from the sensor 20 act to charge the capacitor C1, at a rate determined by the voltage amplitude of the pulse, the value of +A and the values of R2, R3 and C1. Thus, the capacitor C1 charges during the presence of the pulses of the groups and discharges in the space between successive pulses.

The values of resistors R1, R2, and R3 and the capacitor C1 and hence the integrator time constant are chosen so that the only pulse-to-pulse time period which produces a net charge on the capacitor C1 which exceeds a reference voltage +REF is that period which begins with the leading edge of a reference pulse and ends with the leading edge of the enabling pulse. This period is chosen so that the reference pulse will produce a net voltage on the capacitor C1 in excess of the reference voltage for an extended range of engine speeds; i.e. from 30 to 6,000 RPM, the usual operation range of an internal combustion engine.

The output voltage of the integrator amplifier A2 is connected to the noninverting input of a comparator amplifier A4 via a resistor R4. The reference voltage +REF is connected to the inverting input of the amplifier A4 via resistor R5. The comparator amplifier A4 acts to output a positive voltage when the voltage appearing on the output of the integrator A2 is greater than the reference +REF. A high level output from amplifier A4 is therefore an indication of the detection of a reference pulse.

This reference pulse detection signal is transmitted to the D input of a flip flop 50 and the input of an inverter 52. The output of the inverter 52 is coupled to one input of an AND gate 54. The pulse signals from the sensible elements developed by the sensor 20 are also fed via the sensor lead 21 to the CL input of the flip flop 50 and the other input of the AND gate 54.

The flip flop 50 generates the enable signal EN from its Q output when a pulse is applied to the CL input during a reference pulse detection signal from the amplifier A4. Depending on the output of amplifier A4 the AND gate 54 is enabled or disabled by the inverter 52. Pulses from the sensor lead 21 are transmitted through the AND gate 54 when enabled to the commonly connected count C and enable E inputs of a counter 58 after being delayed by a delay circuit 56. Pulses from the output of AND gate 54 are additionally transmitted to the ECU as the trigger signal TRG over trigger lead 28.

The counter 58 stores the pulse counts by incrementing once every time a pulse is received. In the preferred implementation counter 58 is a three bit binary counter for an eight cylinder engine and produces the identity signal INJi on the identification bus 30 from outputs $2^0$, $2^1$, and $2^2$. The counter is reset via the signal RST from the ECU coupled to its R input by the reset lead 24.

The generation of the control signals by the circuit shown in FIG. 3 will now be more fully described with reference to the waveform for the seventh sector and timing periods $t_1$-$t_4$ in FIG. 2. As the waveform for the seventh sector is generated and received by the sensor lead 21 during time period $t_1$-$t_2$, the AND gate 54 clocks the counter 58 with every leading pulse edge until it registers a binary count of 111 or the equivalent of decimal 7. However, for the first six counts the amplifier A2 remains discharged as the duration of the counting pulses are not long enough relative to the interval between pulses to accumulate a net voltage greater than +REF on C1.

At time $t_2$ the reference pulse begins and by its extended duration charges C1 so that, when the enabling pulse, received at time period $t_3$, occurs, the charge on C1 is in excess of the reference voltage +REF. The comparator output A4 transitions to a high level when this occurs. This transition disables the AND gate 54 via inverter 52 and presents the D input of the flip flop 50 with a high level signal. The next pulse or the enabling pulse, received at time period $t_3$, will clock the flip-flop 50 to shift the high level from its input to its Q output thereby generating the enable signal EN to the ECU via signal line 26.

The count or injector to be enabled which is stored on the counter output is read from the identification bus 30 by the ECU and the counter reset via reset lead 24. The seventh injector in the sequence is therefore enabled by the ECU and is now prepared for energization. On the next counting pulse at time $t_4$ the trigger signal TRG is generated by the leading edge of the first counting pulse of segment 8 via sensor lead 21 and the AND gate 54. The first counting pulse of segment 8 also resets the flip-flop 50 because the capacitor C1 has discharged below the reference voltage in the time period between $t_3$ and $t_4$. The delay circuit permits the flip-flop 50 to be cleared before the first counting pulse begins to increment the counter.

While the counter 58 has been illustrated as a part of the pulse processing circuit it is evident that it could alternatively be included in the electronic control unit. In such a case the only control signals communicated to the ECU would be the output of the delay circuit and the before described enable and trigger signals.

While a preferred embodiment of the present invention has been shown and described it will be obvious to those skilled in the art that it should not be so limited because the implementation disclosed will be susceptible to various changes and modifications without departing from the spirit and scope of the invention as presented in the appended claims.

What is claimed is:

1. An apparatus for providing control signals containing timing and steering information to an electronic control unit which actuates a plurality of sequentially operated fuel injectors of an internal combustion engine, said apparatus comprising:

means for generating groups of pulses in a sequential order synchronously with the revolution of the engine, said means includes a rotatable element divided into segments where each segment is associated with an individual injector and contains a group of sensible elements having a number of counting elements identifying the segment by their number and geometry and indicating the timing of actuation of such injector, and sensing means responsive to said elements for generating said groups of pulses; and means for generating said control signals to the electronic control unit in response to said pulse groups, said control signal generating means generating an identification signal steering the next electronic control unit actuation to the identified injector and generating a trigger signal for timing the actuation of the identified injector.

2. An apparatus as defined in claim 1 wherein:

each group of sensible elements further contains a reference element geometrically unique to the rest of the elements in the group for indicating when said segment has been identified.

3. An apparatus as defined in claim 2 wherein:

each group of sensible elements further contains an enabling element indicating when said identification signal is valid for a particular segment.

4. An apparatus as defined in claim 3 wherein said sensing means generates for each group of sensible elements a series of counting pulses, a reference pulse, and an enabling pulse corresponding to said counting elements, reference element, and enabling element, respectively, said pulses generated at the time of passage of said sensible element by said sensing means during rotation of said rotatable element.

5. An apparatus as defined in claim 4 wherein said control signal generation means include:

means for counting said counting pulses and for generating said identification signal as a representation of that count.

6. An apparatus defined in claim 5 wherein said control signal generation means include:

means for decoding the uniqueness of said reference pulse and for generating a detection signal indicating the presence thereof.

7. An apparatus as defined in claim 6 wherein:

said decoding means is electrically coupled to counting means, said detection signal disabling the counting means from incrementing during its presence.

8. An apparatus as defined in claim 7 including:

means, responsive to the coincidence of said reference pulse and said detection signal, for generating an enabling signal indicating the identification of a segment has been completed and that said identification signal is valid.

9. An apparatus as defined in claim 8 wherein said counter means includes:

means, responsive to a reset signal, for clearing said count after transmission of said identification signal.

10. An apparatus as defined in claim 9 wherein said uniqueness of said reference pulses is its length relative to interpulse spacing, and wherein said decoding means includes:

an integrator for generating a voltage proportional to the duration of the pulses in said groups, said integrator charges during the presence of pulses and discharging during the interval between pulses, a comparator for comparing said integrator voltage to a reference voltage and generating said detection signal when said integration voltage exceeds said reference voltage.

11. An apparatus as defined in claim 10 wherein:
said enabling means comprises a D-type flip-flop having its clock input connected to said pulse generating means and its D input connected to the output of said comparator.

12. An apparatus as defined in claim 11 wherein said counting means includes:
a counter with its count input electrically coupled to said pulse generating means and incremented by the presence of said counting pulses.

13. An apparatus as defined in claim 12 wherein said counter means receives said reset signal at its reset input.

14. An apparatus as defined in claim 13 wherein: the output of said counter means is said identification signal.

15. An apparatus as defined in claim 14 further including:
an AND gate disposed between said pulse generation means and said counter, said AND gate transmitting said groups of pulses from its output to said counter when enabled and blocking said group of pulses from said counter when disabled.

16. An apparatus as defined in claim 15 wherein:
one input of said AND gate is electrically coupled to said decoding means and said detection signal disables said AND gate during its presence.

17. An apparatus as defined in claim 16 wherein:
said AND gate generates said trigger signal at its output.

* * * * *